Feb. 10, 1942.     F. HOTCHNER     2,272,202
ANIMATED LUMINOUS DISPLAY
Filed Aug. 21, 1939     2 Sheets-Sheet 1
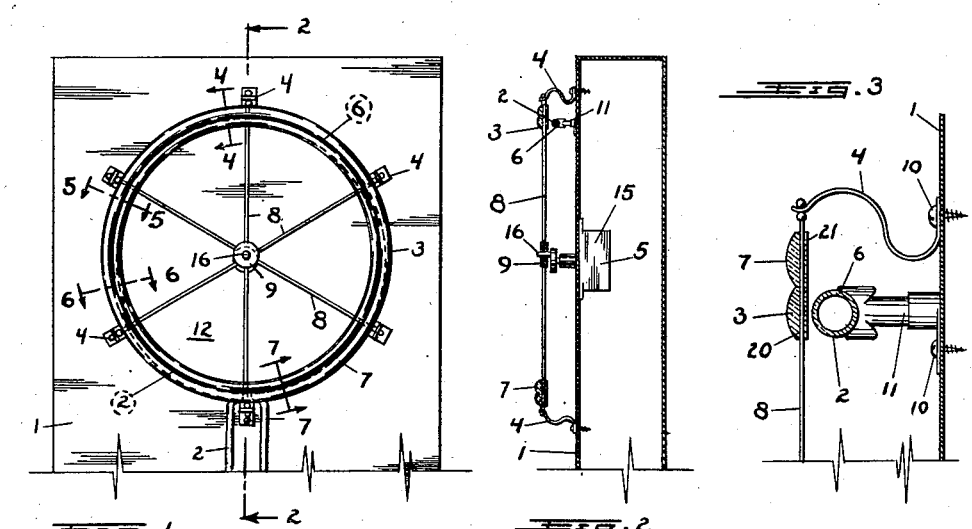
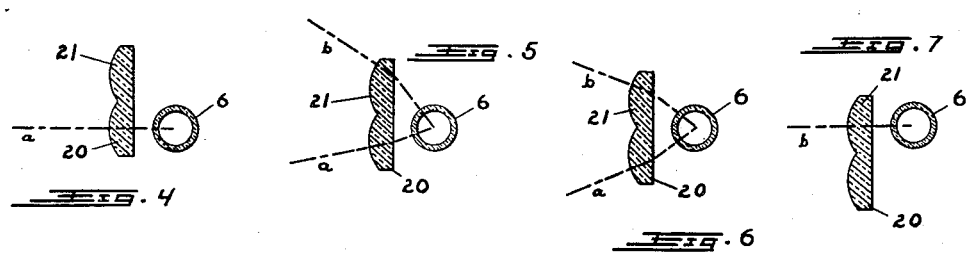
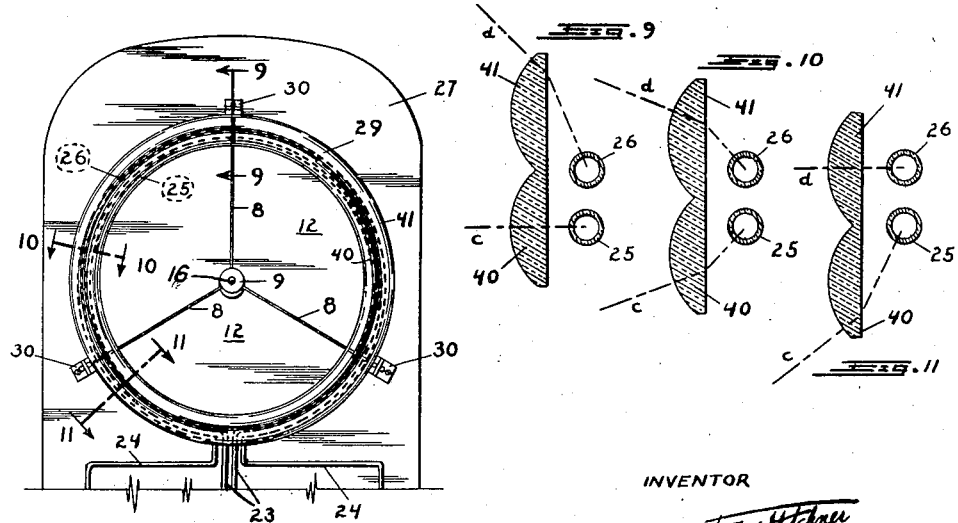
INVENTOR
Fred Hotchner Feb. 10, 1942. F. HOTCHNER 2,272,202
ANIMATED LUMINOUS DISPLAY
Filed Aug. 21, 1939 2 Sheets-Sheet 2
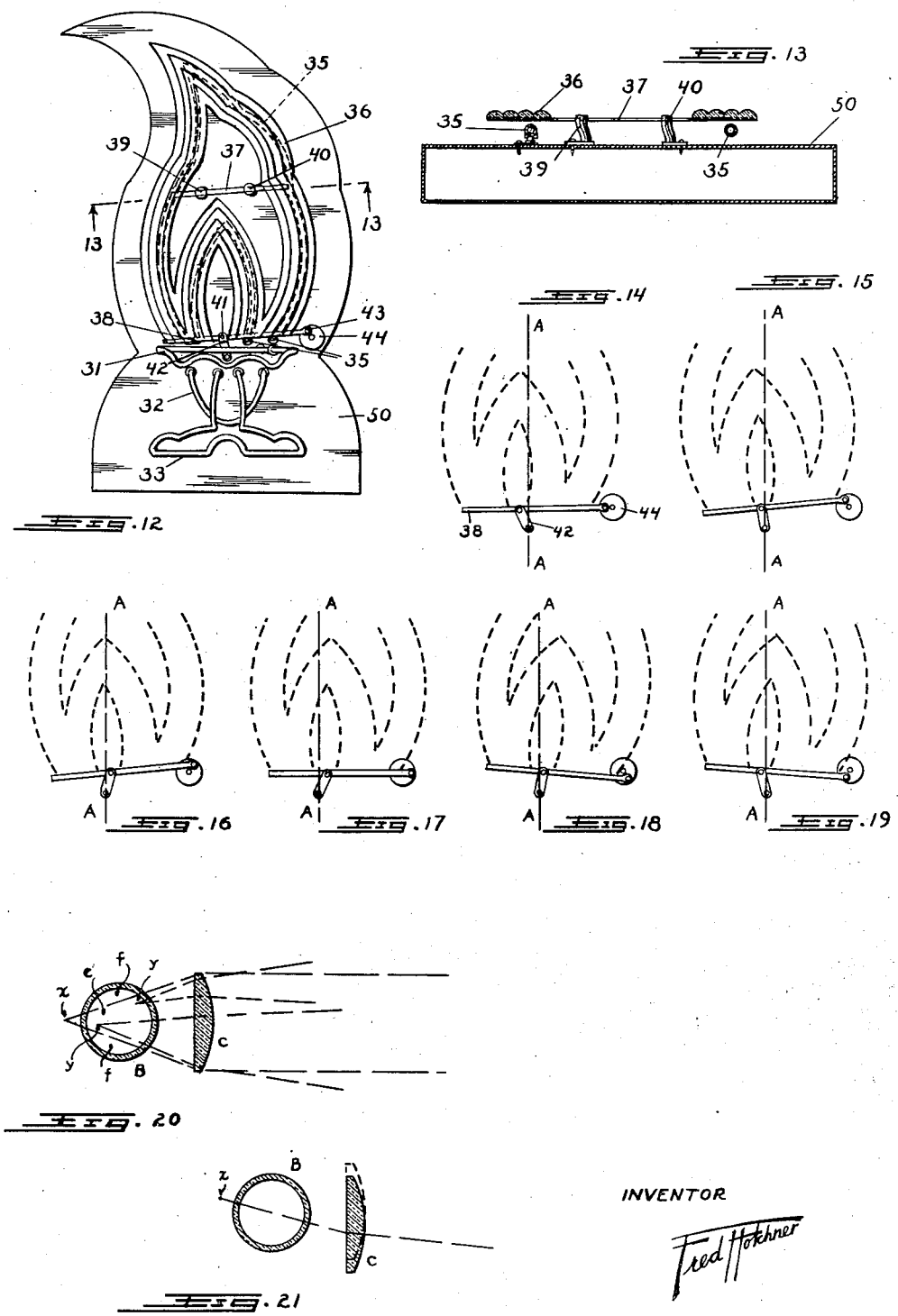
INVENTOR
Fred Hotchner Patented Feb. 10, 1942

2,272,202

UNITED STATES PATENT OFFICE 2,272,202

ANIMATED LUMINOUS DISPLAY

Fred Hotchner, Los Angeles, Calif.

Application August 21, 1939, Serial No. 291,188

12 Claims. (Cl. 40—130)

This invention relates to an animated luminous display in which a traveling or other motion effect is produced along the course of an elongated illuminant, such as exemplified by the gaseous conduction lighting tubes of the advertising display art. It is an object of this invention to produce displays which are novel and attractive and distinguishable over great distances, low in cost, economical in operation, and of such mechanical simplicity as to be suitable for installation in inaccessible locations and capable of operating for long periods of time with little attention.

It is an object hereof to intensify the illuminant to view by condensing radiation therefrom into beams of narrow divergence crosswise thereof, thus to render it distinguishable at long distances. When the illuminant is formed in the representation of a decorative design or advertising inscription it is seen greatly intensified as a whole and in very sharp detail from any point of view reached by all of the beams from the various portions of the design. Beside the greater range over which copy may be displayed effectively by this method, the readability is increased very materially over that of displays formed by gaseous conduction lighting tubes exposed to view in the usual manner. The light intensity of luminous tubes when exposed to direct view decreases inversely with the square of the distance. In accordance with this invention however, the luminous tubes are seen through the condensing lenses of the refractors which condense the rays in one direction into beams of long and narrow cross section. The intensity of the tubes to view therefore decreases much more slowly than as is the case of exposed tubes, being more comparable to the effect of searchlight beams.

It is a further object to secure this improved type of showing over a wide field of view by sweeping the field with the beams so that at any instant during the cycle of operation the observer will distinguish, brilliantly lighted, all those portions of the copy the beams from which cover his position, and the entirety of the copy if all of the beams reach him at that instant.

Likewise, any portion of the copy from which no beams reach his position will appear dark to him, and if the beam coverage of his position be changing he will observe an apparent motion along the outlines of the copy according to the sequence of beam coverage of his position. It is an object of this invention to produce the illusion of movement along the copy outlines, or other animation effects, by sweeping the field of view with the beams in such fashion that from each normal point of view the observer will see a plurality of brilliantly lighted and dark regions along the copy outlines. From instant to instant these regions change in the sequence of the animation effect, which in general will have a prearranged cycle of operation repeated every few seconds.

It is an object to produce such effects while preserving good definition of the copy, each portion of the copy, being seen by a very bright flash for short periods of time, leaves a deeper subjective impression of its form and position than would a less brightly lighted area seen constantly. Thus, although each exposure may be but a very small fraction of the cycle of operation, the fixation of attention due to the novelty of the effect supports the heightened receptivity of the mind to objects defined by extraordinarily bright light to build the picture of the display message. It is to be particularly noted that this result does not depend mainly, or possibly to any large degree, on retention of vision, but upon the building of subjective impressions, the skill of the designer being called for to select the balance of conditions upon which the best results depend.

Thus is secured the further object of developing the maximum attraction effect over a given field of view for the energy consumed, each dark region, as observed at any instant from any point of view, representing not an obstruction of light but a diversion to some other point of view. The net attraction effect, particularly at great distances, being much greater than that secured by inscription lights exposed in the usual manner. Preferably, although not necessarily, the field is swept by the beams in such manner that substantially the same effect is seen from all normal points of view.

Because of the very considerable widths of the glowing gas columns of gaseous conduction lighting tubes as compared with the concentrated filaments of incandescent lamps they do not lend themselves to use in the typical fixtures and projectors of the earlier lighting art. I have discovered however, that for the purposes herein specified, a gaseous conduction lighting tube may be dealt with in very much the same manner as a tubular lamp with a concentrated filament through the tube axis, and a cylindrical lens positioned in front of either source will gather and project the light in substantially the same manner. Further, if the lens be shifted crosswise of the tube the beam will be twisted around the axial line in substantially the same manner in both cases even though the lens is of width comparable to the width of the glowing gas column and spaced from the center thereof a distance of the same order. The explanation of this phenomenon is given below, it being understood that it is advanced merely by way of elucidation and not as a limitation in any manner of the invention as defined by the claims.

I take advantage of the very slight shift sufficient to secure these results to serve the additional object of producing a simple and light mechanism of high degree of dependability which lends itself to mounting in front of the usual tube construction of luminous tube displays with a minimum of special attachments.

A further object of the invention as embodied in a special form thereof is to produce multi-color effects in which the display design appears to change color or travel in colors or otherwise appear animated in more than one color.

It is still a further object of the invention to produce the illusion of continuous movement in one direction along a light source by a reciprocating movement of the lens across the tube or other type of illuminant.

Additional objects of the invention will be apparent from the following specification taken in connection with the accompanying drawings.

The invention is shown in certain preferred embodiments in the accompanying drawings, it being understood that it may be variously modified and constructed in display devices within the purview of the claims. The same reference numeral appearing in more than one view is to be taken as indicating the same or the equivalent part throughout.

Figure 1 is a front elevation of a portion of a luminous tube electric sign showing my invention as applied over that portion of the lighting tube formed in a circular design. The tube is continuous with other design features not shown.

Figure 2 is a cross section of the same taken as indicated by the section line 2—2 in Figure 1 illustrating the relationship of the tube, lens unit, mounting springs and drive unit.

Figure 3 is an enlarged detail section on the section line 2—2.

The diagrammatic cross sections of Figures 4 to 7 show the sequence of position changes of the lens unit with respect to the tube during a cycle of operation at each point of the circle, which sections correspond to the sequence found at any instant of time one half way around the circle at points indicated by the section lines 4—4, 5—5, 6—6, and 7—7 in Figure 1.

Figure 8 is a front elevation of a portion of a luminous tube electric sign having two lighting tubes of contrasting color emission, portions of each of which are formed as concentric circles which are animated by a lens unit constructed and driven to produce a two color traveling border effect.

Figures 9, 10 and 11 are diagrammatic cross sections taken as indicated by the section lines 9—9, 10—10 and 11—11 in Figure 8 illustrating the position changes of the lens unit with respect to the tubes during a cycle of operation.

Figure 12 is a front view of a luminous display device constructed according to this invention in which a flame effect is produced by the reciprocation of a lens structure in front of tubes formed to the outline of the flame.

Figure 13 is a cross section of the same taken as indicated by the section line 13—13 in Figure 12 showing a mounting detail of the lens structure.

Figures 14 to 19 are diagrams of the positions assumed by the lens structure with relation to a vertical reference line showing the sequence of positions and slants of the unit which produce the upward component of the flame illusion.

Figure 20 is a diagrammatic illustration of a tube and lens couple illustrative of the theory of the projection of sharp beams from a light source of material width compared with the lens dimension and spacing.

Figure 21 is a similar illustration showing the condition with the lens shifted sideways of the tube.

According to this invention, gaseous tube displays may be constructed according to conventional standards, the tubes to be animated differing in no essential particular or detail from standard tubes or methods of embodying them in display assemblies. Animated effects are secured by means of lens structures which are movably mounted on the display body proper in front of the tubing to be animated and mechanically shifted across the tubing to variously condense tube radiation into beams and sweep the field of view therewith to produce animated effects.

The lens units essentially provide for the condensation of radiation crosswise of the longest dimension of the illuminants, thus producing beams of long and narrow cross section, the longest dimension corresponding generally to the longest dimension of the illuminants. Preferably the lenses are of the cylindrical type, the cylinder axes corresponding in general to the longest dimension of the corresponding illuminants. Inasmuch as other sections are also suitable for this purpose I use the expression "axis of refraction" in the claims in the generic sense of including the cylindrical axis of an elongated lens having a cylindrical surface extending in the general direction of the corresponding illuminant, and also including the equivalent reference axis of any other refracting element similarly producing a beam of narrow divergence crosswise of the illuminant.

The illuminants may be formed with various decorative or inscription outlines, and consequently the corresponding lenses will have somewhat similar outline, the axes of refraction following the design or inscription outline with certain modifications arising from the needs of individual cases as to preferred beam direction.

Preferably the lenses move slantwise across the illuminants, the resulting beams sweeping an observer position in such manner that the beam from different sections of a given illuminant will cover the observer position at different times. The term "field of view" is used in the claims to designate the area over which a given display is ordinarily expected to be clearly distinguished, the sweep of the beams being preferably, but not necessarily, confined to this area.

A section of a gaseous conduction lighting tube sign is shown in Figure 1, the sign body proper being indicated by numeral 1. A gaseous conduction tube 2 is formed in the outline of a decorative design a portion of which, indicated by numeral 6, is to appear as though revolving in a circular path. The lens unit 3 is movably supported in front of this portion of the tube by means of the springs 4, 4, etc. The drive unit 5 includes the motor 15 which drives the hub 9 of the lens unit by means of the crank 16.

The lens unit includes the double cylindrical lens 7 of circular outline, mounted on the spokes 8, 8, which extend from the hub to the supporting springs. Preferably these spokes are of very fine wire and are held in tension by the springs, thus leaving the area 12 within the circular animation unit substantially clear for additional display matter of any desired type. The springs are secured to the sign by sheet metal screws 10, and the tube is mounted in the usual fashion by insulating stands 11. Reasonable care exercised in observing the recommended spacing between the lenses and the tube is sufficient to insure satisfactory performance as it has been found that this construction is not critical to spacing.

In operation the lens unit is shifted in an eccentric movement by the crank so that each portion of the lens pair reciprocates across the tube, crossing at a different slant for each direction of reciprocation. As a consequence each beam portion swings in an arc around the tube as an axis toward and away from the motor axis. There are, of course, two beams, and an observer position in the normal field of view will be covered by one portion of each of the two beams oppositely disposed with respect to the design center as the lenses are brought into registry with respect to the observer position by the eccentric displacement of the unit. From every position in the normal field of view two brilliant regions will appear as traveling around the circle.

A very slight eccentric displacement is thus sufficient to produce a very considerable apparent movement in the design. By tinting the lenses to different colors selective to the color emission of the illuminant, the effect of two differently colored regions traveling around the design will be produced. A suitable material for the lenses is cellulose acetate which may be moulded with the spokes in position. Numerous constructions other than that shown are also suitable for the purposes hereof and very wide modification in structural details is clearly permissible within the purview of the invention.

The cross section in the radial plane 4—4 shown in Figure 4 is illustrative of the tube-to-lens relationship at that point. The inner lens 20 is herein in registry with the tube with respect to an observer positioned directly forward of the display. The chief ray of a ray bundle originating at the center of the tube is indicated by $a$ traversing the normal to the cylindrical surface. The outer lens 21 is here so far displaced that a ray normal to the cylindrical surface may not be traced from the same origin and thus ordinarily there will be no point in the field of view from which this portion of the outer lens will be luminous to view.

The condition at section 5—5 at the same instant during the operation is shown in Figure 5 in which the chief rays $a$ and $b$ have been drawn to show the directions from which the corresponding lenses will be luminous to view. The transition to the extreme opposite condition to that of Figure 4 is shown in Figures 6 and 7. In general it is desirable to observe loose focusing in order to project beams of some divergence, thus to cover the field of view more effectively. By sharpening the focus the intensity of the bright spots is increased and the length of the spots or bright areas decreased to view. It is found that just the degree of accuracy to be expected from ordinary good sign construction to manufacturers recommended spacings will provide that maximum spread of the beams for the most satisfactory effects.

In the form of the invention shown in Figure 8, two luminous tubes of contrasting color emission are combined with two cylindrical lenses of circular outline to produce a two color whirling border effect. A section of a sign body 27 is shown in this view with a section of each of two luminous tubes 23 and 24, which tubes continue on to other design matter on the part of the sign not shown. A section of each of these tubes is formed into the circular design, being shown in this view by dotted lines and indicated by numerals 25 and 26. It is this section of each tube which is to appear as though animated.

The lens unit 29 includes the cylindrical lenses 40 and 41 of circular outline which may be moulded as a single piece with the spokes 8 in place, and mounted to the sign body by the springs 30, the remaining details being substantially the same as those of the previous views.

Thus in the operation of this device the lens unit is shifted in an eccentric movement to bring the lenses into registry with corresponding tubes alternately in the order shown diagrammatically by Figures 9, 10 and 11. These views show respectively the relationship of lenses and tubes instantaneously at the positions indicated by section lines 9—9, 10—10, and 11—11, in Figure 8. They also show the successive relationships at any one given position around the circle.

In Figure 9, the lens 40 is in alignment with the center point of tube 25 and an observer position directly forward of the display. The chief ray $c$ from the tube center thus represents the beam so projected. The chief ray from the center of tube 26 through lens 41 is indicated by $d$, from which it is apparent that the beam so represented is observed at positions far to the side of the device.

The progression of these beams through a radial plane to the opposite extreme is immediately apparent from Figures 10 and 11, the continuous action of the device being a reciprocation from one extreme to the other of the beams according to this scheme. An observer in the normal field of view will see a bright region of one color and an oppositely disposed bright region of the other color traveling around the design. Obviously, observers in different positions in the field of view will instantaneously see the action at different stages of its cycle, but the effect will be substantially the same from all normal points of view.

Progressive action in a single direction across a design may be had by turning one point of a lens unit around a center and fixing another point within relatively narrow limits. Thus the lens unit may be shifted back and forth across a reference line with one end of the unit leading for each opposite movement to introduce a unidirectional component in the effect. The varying speed of this component due to the sine law displacement of the crank and the varying slant of the lens with relation to the reference line produces a basic action which might be described as "flaring" or "flashing" and is ideal for the fundamental action of such effects as waving flags, flames, etc.

Figures 12 to 19 illustrate the adaptation of this form of the invention to a torch display and illustrate further the manner in which the fundamental action may be modified by suitable conformation of tubes and lenses and by the use of multiple lenses. In the device shown a sign unit 50 is provided with tubes 31, 32 and 33, representing a fire pot, and a tube 35, shown mainly by dotted lines, in the general outline of a flame. The tubes are of the usual gaseous conduction type, are provided with electrodes which extend into suitable terminal housings and connected to current supply in the usual manner, and are mounted on the sign body by means of insulating posts.

The lens unit 36 follows in general the outline of the flame tube and has four parallel cylindrical lens elements moulded integral with the cross bars 37 and 38. The cross bar 37 is mounted to the sign body by the soft rubber posts 39 and 40 which maintain a fixed spacing of the unit from the sign body but permit its movement in any direction within certain limits by the mechanism attached to the bar 38. This mechanism consists of a free-floating link 42 attached to the bar by a pin at 41, and a crank 44 pivoted to the bar at the point 43. The crank is driven by any suitable device, such for instance as the motor shown in Figures 1 and 2. The bar 38 is moved in a plane spaced from the sign body the same distance as the bar 37 by its attachments. The view in Figure 13 shows the details of the upper bar mounting and the general spacing of tube and lenses.

Figures 14 15, 16 and 17 illustrate the movement of the lens from left to right across a vertical reference line A—A. The progression from right to left is represented by Figures 17, 18, 19 and 14. From these views it will be apparent that slant of the lenses with relation to the tube constantly changes and consequently the length of the bright areas is varying. There will be a point on each side movement when the tube and certain lense elements will be in alignment at which point the bright areas will appear to have flared upward, the flame immediately afterward will appear to vanish upward in a natural manner and be followed by slower moving broken flames.

The movement is obviously modified by the horizontal component in the picture outline, there being in this technique endless opportunity for the exercise of artistic skill in the development of animated effects.

Figures 20 and 21 are illustrative of the optical system formed by a gaseous conduction lighting tube and a cylindrical lens coextensive with the same. The tube B, having a glowing gas column substantially filling its bore, is associated with a lens C positioned from the tube center a distance less than the focal length of the lens. It will be found that a beam will be projected of very narrow divergence crosswise of the tube, and this will hold true for a very material variation of spacing. While precise measurements have not been made, this beam spread appears to be no more than might be expected from a concentrated filament extending through the tube bore. With a little care the beam may be controlled to throw an image of width comparable to the width of the tube itself, and furthermore this image will be found to have a surprisingly high intensity. The exact position to secure this result has not been measured, but in general for that spread of beam found most efficient for the purposes of display work, the lens distance from the tube center has been found to be somewhat less than the lens focal distance.

Considering now in Figure 20 a point $x$ of focal spacing from the lens and the space $e$ enclosed by the ray lines from such a point and the lens edges. It is immediately apparent that every point, $y$ within this space is contributing a wedged shape section of rays to the projected beam, and that the greater the beam divergence considered the greater the amounts of this contribution. Furthermore the percentage of rays so collected to a useful end will be less for points close to the lens and greater for points distant from the lens. If the beam divergence is material, then a certain amount of light will be collected even from the spaces $f$ outside of the wedge from the focal point. It has been found that the beams so developed are comparable in intensity with what might be collected from filament lamps allowing for the ordinary variations in the filament mounting and sag.

In Figure 21 the lens is shown in a position displaced crosswise of the tube, its normal position being shown by broken lines. The principal ray of the projected beam is shown by a broken line and projected backward to what will now be the equivalent focal point $x$. From this it will be apparent that the same conditions hold as in Figure 20 with the principal ray determining very closely the angular shift and the lens automatically collecting an equivalent bundle of rays along this new reference line.

The terminology of the claims is to be broadly construed within the limitations imposed by the prior art. In particular the term "lens" is used in the generic sense of including any type of refracting member functioning as described and claimed. The term "display pattern" includes any decorative or descriptive conformation, such as any character, symbol, numeral, border design, etc.

Having thus described my invention, what I claim is:

1. In combination with an illuminant elongated in the form of a display pattern, a refracting member movable in front thereof and having a plurality of adjacent lens formations characteristic of said display pattern and of such conformation as to produce distinctive distorted images of the same for different positions in front of said illuminant, and means to move said member in a path in front of said illuminant determined to produce an animation effect along the same.

2. In combination with an illuminant elongated in the form of a display pattern, a refracting member movable in front thereof and having a plurality of lens formations characteristic of said pattern and so formed as to produce a different distorted image of said illuminant for each of several different positions of said member as observed by a person in the normal field of view, and means to move said member from one of said positions to another to produce an illusion of animation along said pattern.

3. In combination with an illuminant elongated in the form of a display pattern, a refracting member having a plurality of lens formations characteristic of said display pattern and conformed to project beams of narrow divergence crosswise of said illuminant, and means to move said member across and in front of said illuminant in a path determined to sweep the field of view with said beams in such order as to produce the illusion of animation along said pattern as observed by a person in the normal field of view.

4. In combination with an illuminant elongated into a circuitous pattern, a lens member having a refracting conformation with a major refracting axis of similar outline to said pattern, and means to move said member in front of said illuminant through a path determined to maintain a spacing between said illuminant and lens member such that the field of view is swept by beams of narrow divergence crosswise of said illuminant upon the movement of said lens member, and means to move said lens member eccentrically around a given point.

5. In combination with an illuminant elongated in a display pattern having a circuitous component, a lens member movable in front thereof and having a refracting conformation with a major axis of refraction of similar outline determined to project a beam of narrow divergence crosswise of said illuminant, and means to move said member across in front of said illuminant by eccentric displacement around a given point.

6. An illuminated display device including: a display element comprising a plurality of adjacent, spectrally contrasting, elongated illuminants in the outline of a display pattern, a refracting element positioned in front of the same and having a refracting formation characteristic of said display pattern, and means to move one of said elements slantwise across the other to bring different portions of said illuminants into optical alignment through said refracting formation at different times with a given observer position in the normal field of view to produce an illusion of color change along the outline of said display pattern.

7. An illuminated display device including: a display element comprising a plurality of adjacent, spectrally contrasting, elongated illuminants in the outline of a display pattern, a refracting element positioned in front of the same and having a refracting formation characteristic of said display pattern, and means to move one of said elements back and forth across the other, slantwise at an opposite slant for each opposite movement, to bring different portions of said illuminants into optical alignment through said refracting formation at different times with a given observer position in the normal field of view to produce an illusion of color change along the outline of said display pattern.

8. An illuminant elongated in the form of a display pattern, a refracting member positioned in front of the same having a lens formation characteristic of said display pattern and so related to said illuminant in position as to produce distinctive distorted images of the same when moved from position to position in front of the same, and means to move one of said elements with relation to the other through a path determined to produced an animation effect along said display pattern to an observer in the normal field of view.

9. An illuminant elongated in the form of a display pattern, a refracting member located in front of the same having a lens formation characteristic of said display pattern and of such conformation as to produce distinctive distorted images of said illuminant when moved from position to position in front of the same, and means to move one of said elements with respect to the other so as to in effect pass said lens formation back and forth across said illuminant, slantwise at an opposite slant for each opposite movement, to produce the effect of motion along said display pattern.

10. An illuminant elongated in the form of a display pattern, a refracting member located in front of the same and having a lens formation characteristic of said display pattern and of such conformation as to project a beam of narrow divergence crosswise of said illuminant, and means to move one of said elements with respect to the other in a path determined to sweep the field of view with said beam in such order as to produce the illusion of animation along said illuminant.

11. An illuminated display device including: a display element comprising a plurality of adjacent, spectrally contrasting, elongated illuminants in the outline of a display pattern, a refracting element positioned in front of the same and having a refracting formation characteristic of said display pattern and so related to said illuminants in position as to produce distinctive distorted images of said illuminants when moved from position to position in front of the same, and means to move one of said elements with relation to the other through a path determined to produce an animation effect along said display pattern to an observer in the normal field of view.

12. An illuminated display device including: a display element comprising a plurality of adjacent, spectrally contrasting, elongated illuminants in the outline of a display pattern, a refracting element positioned in front of the same and having a refracting formation characteristic of said display pattern, of such cross sectional conformation and so related in position to said illuminants as to project beams of narrow divergence crosswise of said illuminants, and means to move one of said elements with respect to the other in a path determined to sweep the normal field of view with said beams in such order as to produce the illusion of animation along said display pattern in changing colors.

FRED HOTCHNER.